US012636817B1

(12) United States Patent
Zheng

(10) Patent No.: US 12,636,817 B1
(45) Date of Patent: May 26, 2026

(54) WEIGHTED GARMENT COUNTERWEIGHT BLOCK, MIXING DEVICE, AND MANUFACTURING PROCESS THEREOF

(71) Applicant: Ninghai Yuteng Arts & Crafts Co., Ltd., Ningbo (CN)

(72) Inventor: Lingyuan Zheng, Ningbo (CN)

(73) Assignee: Ninghai Yuteng Arts & Crafts Co., Ltd., Ningbo (CN)

( * ) Notice: Subject to any disclaimer, the term of this patent is extended or adjusted under 35 U.S.C. 154(b) by 0 days.

(21) Appl. No.: 19/403,276

(22) Filed: Nov. 28, 2025

(30) Foreign Application Priority Data

Oct. 23, 2025 (CN) .......................... 202511522107.7

(51) Int. Cl.
| | |
|---|---|
| B29B 7/14 | (2006.01) |
| B29B 7/24 | (2006.01) |
| B29C 39/02 | (2006.01) |
| B29C 51/10 | (2006.01) |
| B29C 65/62 | (2006.01) |
| B29C 70/58 | (2006.01) |
| A63B 21/065 | (2006.01) |
| B29K 9/06 | (2006.01) |
| B29K 75/00 | (2006.01) |
| B29K 305/12 | (2006.01) |
| B29L 31/48 | (2006.01) |

(52) U.S. Cl.
CPC ............... *B29B 7/14* (2013.01); *B29B 7/244* (2013.01); *B29C 39/025* (2013.01); *B29C 51/10* (2013.01); *B29C 65/62* (2013.01); *B29C 70/58* (2013.01); *A63B 21/065* (2013.01); *B29C 2791/002* (2013.01); *B29C 2791/006* (2013.01); *B29K 2009/06* (2013.01); *B29K 2075/00* (2013.01); *B29K 2305/12* (2013.01); *B29L 2031/4842* (2013.01)

(58) Field of Classification Search
CPC .................................. B29B 7/14; B29B 7/421
USPC ......... 366/76.4, 80, 81, 156.2, 157.1, 177.1, 366/178.1, 319, 321
See application file for complete search history.

(56) References Cited

U.S. PATENT DOCUMENTS

| | | | |
|---|---|---|---|
| 211,576 A | * | 1/1879 | Lawton ................. B01F 27/192 366/296 |
| 963,122 A | * | 7/1910 | Damon .................... B02C 7/06 241/247 |

(Continued)

*Primary Examiner* — David L Sorkin

(57) ABSTRACT

A weighted garment's counterweight block includes two waterproof layers sequentially disposed from top to bottom, and a flexible cold-storage layer and a flexible weighted layer disposed between the two waterproof layers and distributed from top to bottom respectively. The mixing device for the counterweight block of the weighted garment includes a cylindrical stirring chamber disposed horizontally, two tubular material-feeding chambers concentrically connected to two ends of the cylindrical stirring chamber respectively and both communicating with an interior of the cylindrical stirring chamber, a granular material-feeding tube connected to an upper side of the cylindrical stirring chamber and communicating with the interior of the cylindrical stirring chamber, a material-discharging tube connected to a lower side of the cylindrical stirring chamber and communicating with the interior of the cylindrical stirring chamber, and a mixing mechanism disposed within the interior of the cylindrical stirring chamber and interiors of the two tubular material-feeding chambers.

7 Claims, 7 Drawing Sheets

(56)                    References Cited

U.S. PATENT DOCUMENTS 1,088,423 A * 2/1914 Hubbard ................. B03B 5/623
                                                        209/43
1,424,445 A * 8/1922 Bowen .................... B29B 7/125
                                                        366/90
3,224,739 A * 12/1965 Schuur ................. B29C 48/687
                                                        366/322
5,352,035 A * 10/1994 Macaulay ............. B01F 27/726
                                                        366/186

* cited by examiner

12

12

Hydrogel

Mixture of
polyurethane
and iron sand

1001

1002

10

11

WEIGHTED GARMENT COUNTERWEIGHT BLOCK, MIXING DEVICE, AND MANUFACTURING PROCESS THEREOF

CROSS REFERENCE TO RELATED APPLICATIONS

The present application claims the benefit of Chinese Patent Application No. 202511522107.7 filed on Oct. 23, 2025, the contents of which are incorporated herein by reference in their entirety.

TECHNICAL FIELD

The present disclosure relates to the field of sports training technology, and in particular to a weighted garment's counterweight block, and its mixing device and manufacturing process.

BACKGROUND TECHNOLOGY

Weighted garments (also known as weighted vests) are training equipment that increases exercise intensity by increasing the load on a body. They are mainly used in military training, sports training, and other fields. Traditional weighted garments mostly use solid materials such as sandbags and lead weights as counterweight blocks. These counterweight blocks are relatively hard and lack flexibility. When athletes or users perform large movements, such as bending down, bending to the side, or twisting, they are prone to causing discomfort such as chafing in the waist or hands. This hinders the body's natural movement and reduces the comfort and effectiveness of training. In addition, the solid filling is also relatively concentrated, making it difficult to flexibly adjust according to the user's body shape and exercise needs, and resulting in uneven weight distribution and affecting the body's balance and coordination.

To overcome the shortcomings of solid counterweight blocks, weighted garment using liquid counterweights has emerged on the market. Utilizing the fluidity of liquid, the garment can better conform to the body and improve comfort. However, liquid counterweights also have significant drawbacks: Firstly, the sealing of the liquid filler requires extremely high precision. If the fabric used to enclose the liquid counterweight tears, the liquid will leak out, soiling clothing and the surrounding environment, rendering the counterweight unusable, and significantly shortening its lifespan. Secondly, liquid counterweights pose a significant risk when washed. Under the intense rotation, tumbling, and twisting of a washing machine, the seams or sealing points of the counterweight pocket may fatigue and crack, leading to leakage. Once leaked, the counterweight is essentially unusable, making it inconvenient to use.

Therefore, a solution is urgently needed.

SUMMARY

In view of the current state of the prior art, the technical problem to be solved by the present disclosure is to provide a counterweight block for a weighted garment, a mixing device and a manufacturing process thereof, which has better flexibility and tear resistance to maintain structural stability and improve wearing comfort, and also significantly improves durability to extend service life, improves ease of use and comfort, and improves processing efficiency and quality.

The technical solution adopted by the present disclosure to solve the above-mentioned technical problems is as follows: a mixing device for a counterweight block of a weighted garment, wherein the mixing device includes a cylindrical stirring chamber disposed horizontally, two tubular material-feeding chambers concentrically connected to two ends of the cylindrical stirring chamber respectively and both communicating with an interior of the cylindrical stirring chamber, a granular material-feeding tube connected to an upper side of the cylindrical stirring chamber and communicating with the interior of the cylindrical stirring chamber, a material-discharging tube connected to a lower side of the cylindrical stirring chamber and communicating with the interior of the cylindrical stirring chamber, and a mixing mechanism disposed within the interior of the cylindrical stirring chamber and interiors of the two tubular material-feeding chambers.

The mixing mechanism includes two chamber covers sealingly fixed at end openings of the two tubular material-feeding chambers respectively, and a horizontal rotatable stirring shaft inserted through and connected concentrically between the two chamber covers, two ends of the stirring shaft being respectively provided with two screw portions having mutually opposite helical directions, and the two screw portions being disposed within the interiors of the two tubular material-feeding chambers respectively.

The mixing mechanism further includes two stirring blade units disposed on the stirring shaft, distributed diagonally to each other, and both located within the interior of the cylindrical stirring chamber, each of the stirring blade units including a plurality of stirring blades fixed on the stirring shaft and arranged sequentially along a length direction of the stirring shaft, wherein the plurality of stirring blades of one of the stirring blade units and the plurality of stirring blades of another one of the stirring blade units are distributed mutually interspaced from each other.

The mixing device further includes two metering valves, one connection port of the two metering valves being respectively connected to an outer wall of the two tubular material-feeding chambers, and communicating with the interiors of the two tubular material-feeding chambers respectively.

The shape of each of the stirring blades is elliptical, and a hole is opened in each of the stirring blades.

A plurality of material-evening rods are inserted through and fixed to each of the stirring blades, and horizontally arranged and sequentially distributed along a contour of each of the stirring blades around a periphery of the hole.

Preferably, a trough-type recessed hole is opened on an outer wall at the upper side of the cylindrical stirring chamber. Correspondingly, a flat-port material-distributing tube is provided at a lower end opening of the granular material-feeding tube, an end opening of the flat-port material-distributing tube being detachably embedded and fixed within an interior of an opening of the trough-type recessed hole.

Preferably, an arc-shaped limiting surface having an opening side facing upward is formed on a bottom surface of the trough-type recessed hole. Correspondingly, an arc-shaped material-distributing plate having an opening side facing upward is further provided in the trough-type recessed hole, an outer wall at a bottom of the arc-shaped material-distributing plate being abutted on the arc-shaped limiting surface. A trough-type material-dropping hole is opened between the arc-shaped limiting surface and an inner wall at the upper side of the cylindrical stirring chamber. A plurality of material-distributing holes are opened in the arc-shaped material-distributing plate and are evenly distributed, each of the material-distributing holes being disposed above an upper end opening of the trough-type material-dropping hole.

Preferably, a sealing and pressure-maintaining assembly is further provided on the cylindrical stirring chamber, and a valve bore is formed between outer walls at the two ends of the cylindrical stirring chamber, the valve bore being horizontally disposed, intersecting and communicating with the trough-type material-dropping hole. The sealing and pressure-maintaining assembly includes a valve stem sealingly and rotatably disposed concentrically within the valve bore, and a servo motor fixed on the outer wall at one of the two ends of the cylindrical stirring chamber, a rotation shaft of the servo motor being horizontally disposed and fixed concentrically at one end of the valve stem.

Preferably, a lower portion of the valve bore intersects and communicates with an inner wall at the upper side of the cylindrical stirring chamber. A first arc-shaped connecting surface is formed on an outer wall of the valve stem at one side of the interior of the cylindrical stirring chamber. The curvature of the first arc-shaped connecting surface matches with the curvature of the inner wall of the cylindrical stirring chamber. A trough-type material-guiding hole is formed between the first arc-shaped connecting surface and the outer wall at one side of the valve stem directly facing the trough-type material-dropping hole.

Preferably, a second arc-shaped connecting surface is further formed on the outer wall of the valve stem on one side of the trough-type material-guiding hole. The curvature of the second arc-shaped connecting surface matches with the curvature of the inner wall of the cylindrical stirring chamber. The position of the second arc-shaped connecting surface is cooperating with the position of the first arc-shaped connecting surface.

Preferably, the mixing device further includes at least one pressurizing valve, one connection port of each pressurizing valve being connected to the outer wall at the upper side of the cylindrical stirring chamber, and communicating with the interior of the cylindrical stirring chamber, without intersecting with the trough-type material-dropping hole and the valve bore.

A counterweight block of a weighted garment, wherein the counterweight block includes two waterproof layers sequentially disposed from top to bottom, and a flexible cold-storage layer and a flexible weighted layer disposed between the two waterproof layers and distributed from top to bottom respectively, the flexible weighted layer being made of a high-molecular polymer material, and the flexible weighted layer being internally filled with counterweight granules.

Preferably, each of the waterproof layers utilizes SBR diving cloth. The flexible cold-storage layer is made of cold compress hydrogel, and the flexible weighted layer is made of polyurethane. The counterweight granules utilize iron sand.

A manufacturing process for a counterweight block of a weighted garment, wherein the process includes the following steps:

S1: take a piece of SBR diving cloth and lay it flat on top of a molding module, then press it into a mold cavity located at a top portion of the molding module, and ensure that edges of the SBR diving cloth remain outside an opening of the mold cavity;

S2: connect an air inlet of a vacuum pumping device to an air outlet tube connected to one side of the molding module, a plurality of capillary holes are formed on an inner wall of the mold cavity, and are communicating with the air outlet tube, after starting the vacuum pumping device to operate, air inside the mold cavity is continuously extracted, thereby causing the SBR diving cloth to tightly adhere to the inner wall of the mold cavity and form a space having a same shape as an interior of the mold cavity;

S3: introduce liquid polyurethane mixed with iron sand into the space formed by the SBR diving cloth according to an interior contour of the mold cavity, a flexible weighted layer having elasticity is formed after the liquid polyurethane solidifies;

S4: spread hydrogel evenly onto a surface of the solidified polyurethane, subsequently, take another piece of SBR diving cloth and cover it onto a surface of the hydrogel, a flexible cold-storage layer is formed above the flexible weighted layer after the hydrogel solidifies;

S5: take out the two pieces of SBR diving cloth as well as the flexible weighted layer and the flexible cold-storage layer located between the two pieces of SBR diving cloth, and sew the two pieces of SBR diving cloth to each other along edge contours of the flexible weighted layer and the flexible cold-storage layer.

Compared with the prior art, the advantages of the present disclosure are as follows:

1. The flexible weighted layer of the present disclosure is made of polyurethane material. Compared with traditional solid fillers such as sandbags and lead blocks, this material has better flexibility and tear resistance, and can better adapt to the movement of the body while maintaining structural stability. The iron sand particles mixed in the polyurethane material have a high density, which can provide a large load in a small volume. At the same time, the granular iron sand can be evenly distributed to avoid excessive local load, thereby improving uniformity and stability of the weight. This allows the counterweight to better adapt to the curves of the human body and fit closely to the body during exercise, thereby improving the comfort of wearing it.

2. Compared with liquid counterweights, the present disclosure has significantly improved durability. Liquid counterweights have extremely high sealing requirements, and once broken, they are prone to leakage. However, the flexible weighted layer made of polymer material does not have this leakage problem. It has better tear resistance and can withstand the pulling, twisting and other external forces during movement, reducing the risk of counterweight damage due to local breakage, thereby extending the service life of the counterweight.

3. Unlike liquid counterweights, which pose a significant risk during washing, the flexible weighted layer of the present disclosure is much easier to clean. It eliminates the risk of the liquid-encasing fabric tearing due to the rotation, tumbling, and twisting of the washing machine during the washing process, as is the case with liquid counterweights. This makes it easier to clean the counterweight after daily use, keeping it clean without affecting its structure and function, thus further improving its durability and ease of use.

4. The two waterproof layers of the present disclosure are made of SBR diving cloth, which can be directly purchased. This material has good waterproof and abrasion resistance, can withstand washing and various environments in daily use, while maintaining waterproof performance and further improving the durability of the counterweight.

5. The flexible cold storage layer of the present disclosure is made of cold compress hydrogel. This material has good flexibility and cold storage performance. When used, it is placed towards the user's skin, which can produce a continuous cooling effect on the skin during exercise, thereby improving the comfort of using the counterweight.

6. The mixing device of the present disclosure can quickly and thoroughly mix the two monomer materials for synthesizing polyurethane with iron sand, which not only accelerates the reaction rate between the two monomer materials, but also ensures that the iron sand is evenly distributed in the polyurethane synthesized from the two monomer materials, thereby improving processing efficiency and processing quality.

DETAILED EMBODIMENTS

Unless otherwise defined, the technical or scientific terms used in the present disclosure shall have the ordinary meaning understood by one of ordinary skill in the art to which this disclosure pertains. The terms "first," "second," and similar terms used in this disclosure do not indicate any order, quantity, or importance, but are merely used to distinguish different components. The terms such as "comprising" or "including" mean that the element or object preceding the word encompasses the elements or objects listed after the word and their equivalents, without excluding other elements or objects. The terms such as "connected" or "linked" are not limited to physical or mechanical connections, but can include electrical connections, whether direct or indirect. The terms such as "upper", "lower", "left", and "right" are used only to indicate relative positional relationships. When the absolute position of the described object changes, the relative positional relationship may also change accordingly. The term "and/or" is merely a description of the relationship between related objects, indicating that three relationships can exist. For example, A and/or B can represent: A alone, A and B together, and B alone. Additionally, the character "/" in this document generally indicates that the preceding and following related objects have an "or" relationship.

To keep the following description of the embodiments of the present disclosure clear and concise, detailed descriptions of known functions and known components are omitted.

Figure 1:
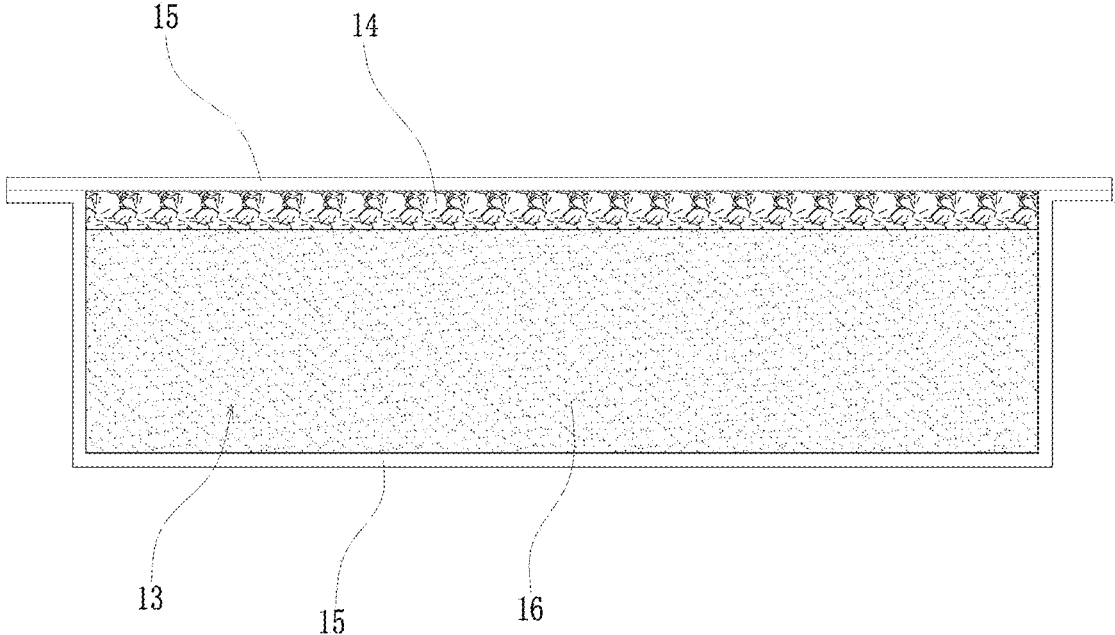
FIG. 1 is a cross-sectional structural diagram of the counterweight block of the present disclosure.
Figure 2:
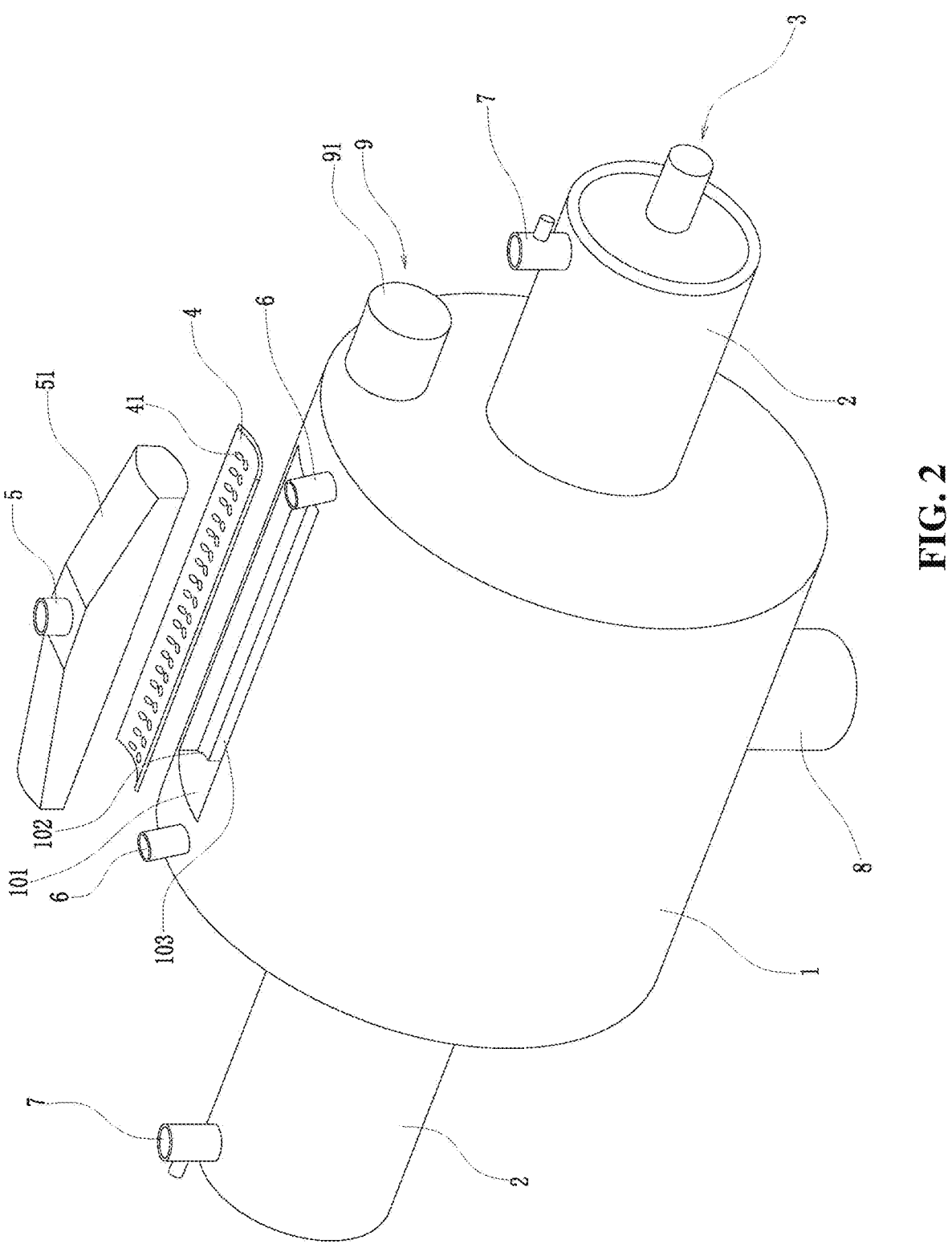
FIG. 2 is a top-side exploded structural diagram of the mixing device of the present disclosure.
Figure 3:
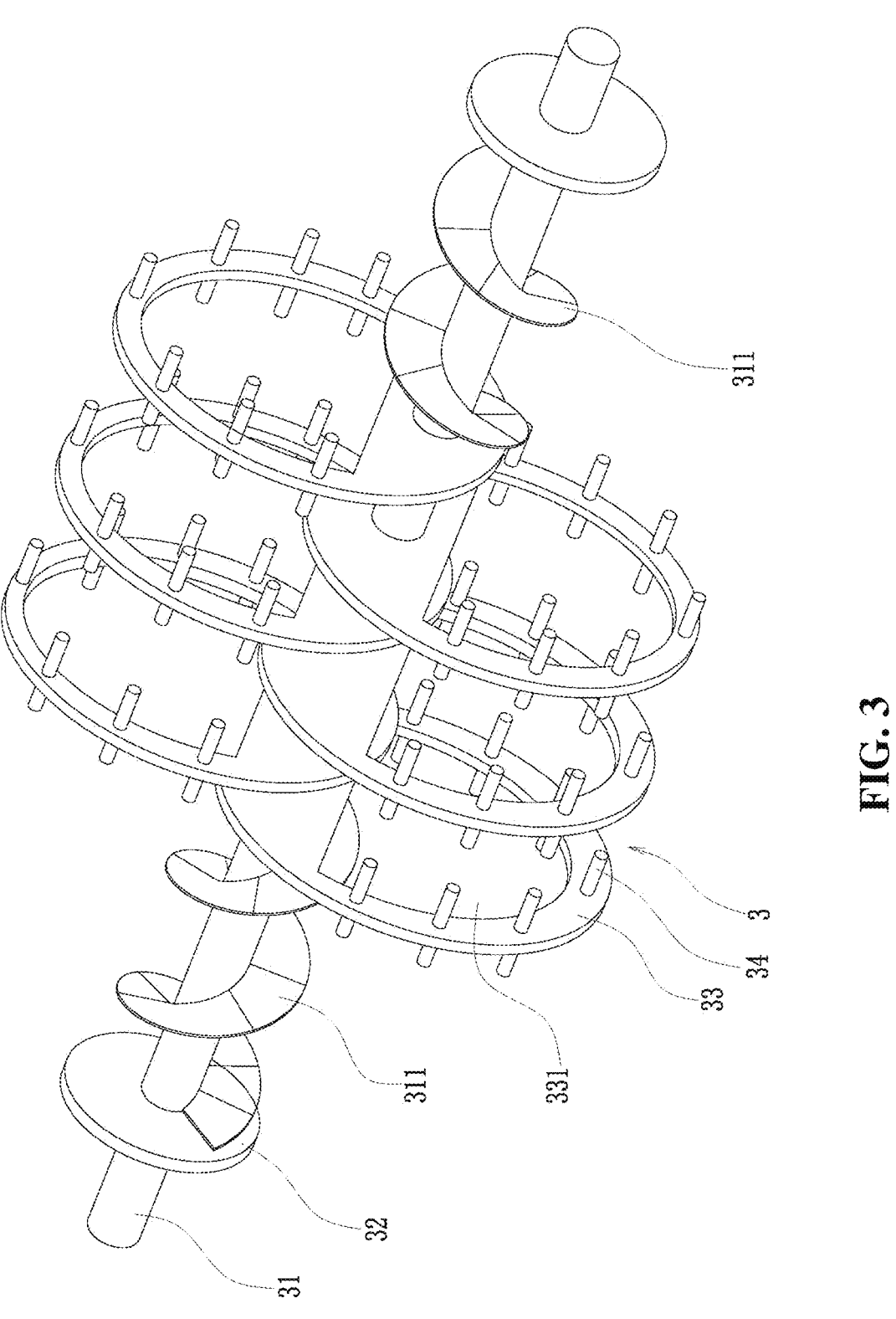
FIG. 3 is a top-side structural diagram of the mixing mechanism of the mixing device of the present disclosure.
Figure 4:
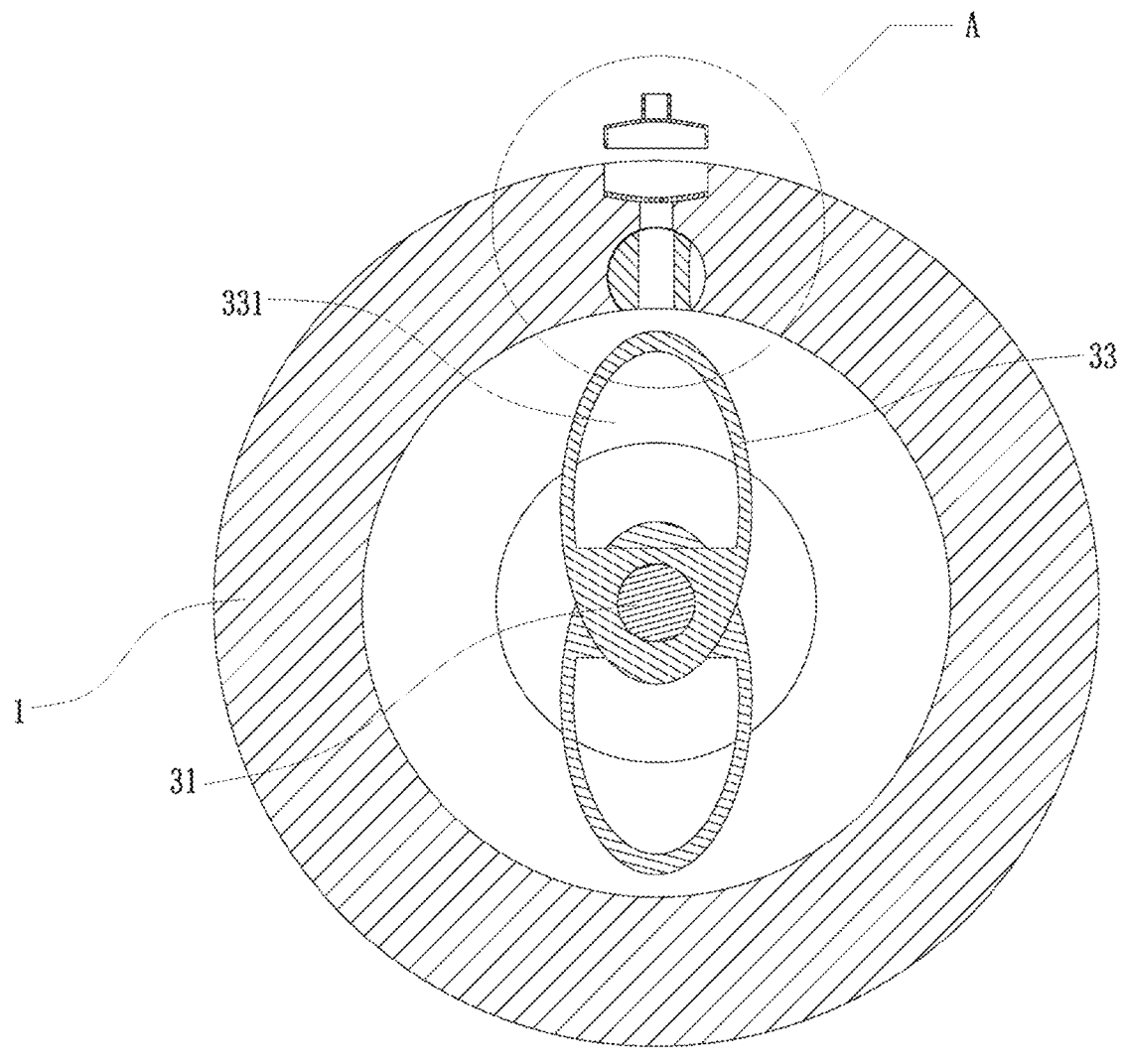
FIG. 4 is a radial cross-sectional structural diagram of the mixing device of the present disclosure.
Figure 5:
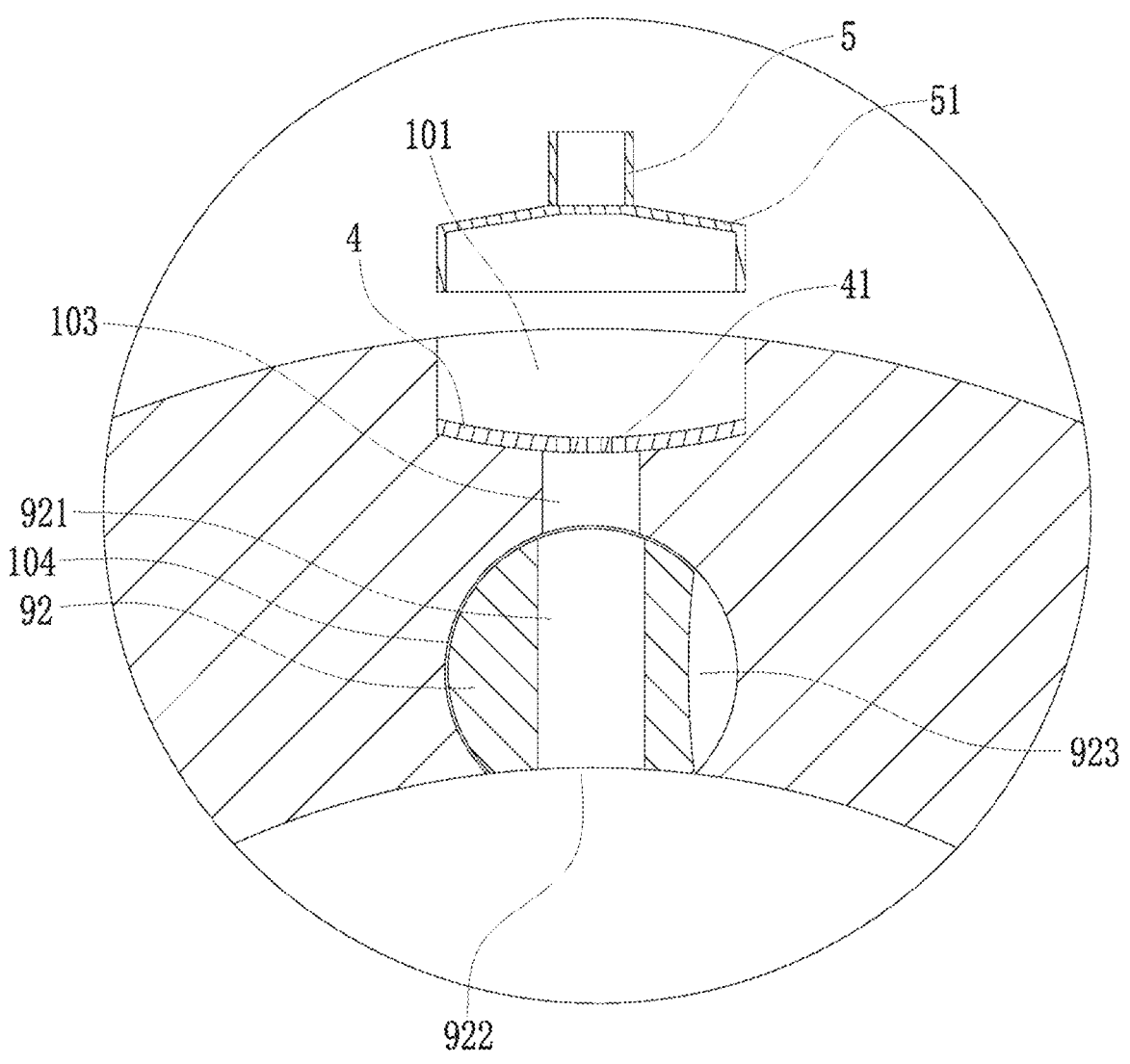
FIG. 5 is a partially enlarged structural diagram at A of the present disclosure.
Figure 6:
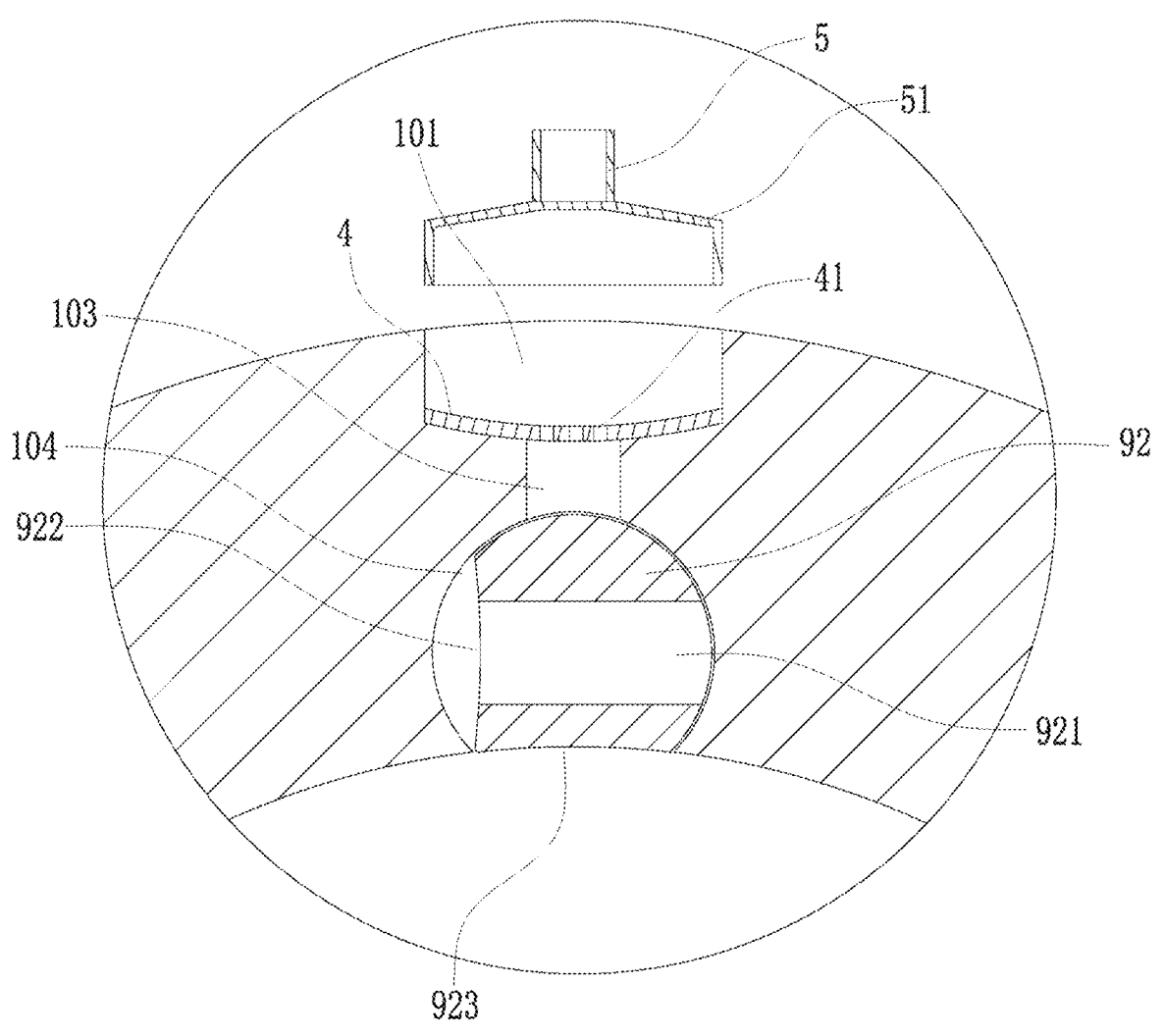
FIG. 6 is a partially enlarged structural diagram of the trough-type material-guiding hole of the present disclosure when it is in a closed state.

As shown in FIG. 1, a counterweight block of a weighted garment includes two waterproof layers 15 sequentially disposed from top to bottom. A flexible cold-storage layer 14 and a flexible weighted layer 13 are disposed between the two waterproof layers 15 and distributed from top to bottom respectively.

The flexible weighted layer 13 is made of a high-molecular polymer material, and the flexible weighted layer 13 is internally filled with counterweight granules 16.

Each of the waterproof layers 15 utilizes SBR diving cloth.

The flexible cold-storage layer 14 is made of cold compress hydrogel.

The flexible weighted layer 13 is made of polyurethane, and the counterweight granules 16 utilize iron sand.

As shown in FIGS. 2-6, a mixing device for a counterweight block of a weighted garment includes a cylindrical stirring chamber 1 disposed horizontally, two tubular material-feeding chambers 2 concentrically connected to two ends of the cylindrical stirring chamber 1 respectively and both communicating with an interior of the cylindrical stirring chamber 1, a granular material-feeding tube 5 connected to an upper side of the cylindrical stirring chamber 1 and communicating with the interior of the cylindrical stirring chamber 1, a material-discharging tube 8 connected to a lower side of the cylindrical stirring chamber 1 and communicating with the interior of the cylindrical stirring chamber 1, and a mixing mechanism 3 disposed within the interior of the cylindrical stirring chamber 1 and interiors of the two tubular material-feeding chambers 2.

The mixing mechanism 3 includes two chamber covers 32 sealingly fixed at end openings of the two tubular material-feeding chambers 2 respectively, and a horizontal rotatable stirring shaft 31 inserted through and connected concentrically between the two chamber covers 32. Two ends of the stirring shaft 31 are respectively provided with two screw portions 311 having mutually opposite helical directions, and the two screw portions 311 are disposed within the interiors of the two tubular material-feeding chambers 2 respectively.

The mixing mechanism 3 further includes two stirring blade units disposed on the stirring shaft 31, distributed diagonally to each other, and both located within the interior of the cylindrical stirring chamber 1. Each of the stirring blade units includes a plurality of stirring blades 33 fixed on the stirring shaft 31 and arranged sequentially along a length direction of the stirring shaft 31, wherein the plurality of stirring blades 33 of one of the stirring blade units and the plurality of stirring blades 33 of another one of the stirring blade units are distributed mutually interspaced from each other.

The mixing device further includes two metering valves 7, one connection port of the two metering valves 7 being respectively connected to an outer wall of the two tubular material-feeding chambers 2, and communicating with the interiors of the two tubular material-feeding chambers 2 respectively.

The shape of each of the stirring blades 33 is elliptical, and a hole 331 is opened in each of the stirring blades.

A trough-type recessed hole 101 is opened on an outer wall at the upper side of the cylindrical stirring chamber 1. Correspondingly, a flat-port material-distributing tube 51 is provided at a lower end opening of the granular material-feeding tube 5, an end opening of the flat-port material-distributing tube 51 being detachably embedded and fixed within an interior of an opening of the trough-type recessed hole 101.

An arc-shaped limiting surface 102 having an opening side facing upward is formed on a bottom surface of the trough-type recessed hole 101. Correspondingly, an arc-shaped material-distributing plate 4 having an opening side facing upward is further provided in the trough-type recessed hole 101. An outer wall at a bottom of the arc-shaped material-distributing plate 4 is abutted on the arc-shaped limiting surface 102.

A trough-type material-dropping hole 103 is opened between the arc-shaped limiting surface 102 and an inner wall at the upper side of the cylindrical stirring chamber 1. A plurality of material-distributing holes 41 are opened in the arc-shaped material-distributing plate 4 and are evenly distributed. Each of the material-distributing holes 41 is disposed above an upper end opening of the trough-type material-dropping hole 103.

A sealing and pressure-maintaining assembly 9 is further provided on the cylindrical stirring chamber 1. A valve bore 104 is formed between outer walls at the two ends of the cylindrical stirring chamber 1. The valve bore 104 is horizontally disposed, intersecting and communicating with the trough-type material-dropping hole 103. The sealing and pressure-maintaining assembly 9 includes a valve stem 92 sealingly and rotatably disposed concentrically within the valve bore 104, and a servo motor 91 fixed on the outer wall at one of the two ends of the cylindrical stirring chamber 1. A rotation shaft of the servo motor 91 is horizontally disposed and fixed concentrically at one end of the valve stem 92.

A lower portion of the valve bore 104 intersects and communicates with an inner wall at the upper side of the cylindrical stirring chamber 1. A first arc-shaped connecting surface 922 is formed on an outer wall of the valve stem 92 at one side of the interior of the cylindrical stirring chamber 1. The curvature of the first arc-shaped connecting surface 922 matches with the curvature of the inner wall of the cylindrical stirring chamber 1. A trough-type material-guiding hole 921 is formed between the first arc-shaped connecting surface 922 and the outer wall at one side of the valve stem 92 directly facing the trough-type material-dropping hole 103.

A second arc-shaped connecting surface 923 is further formed on the outer wall of the valve stem 92 on one side of the trough-type material-guiding hole 921. The curvature of the second arc-shaped connecting surface 923 matches with the curvature of the inner wall of the cylindrical stirring chamber 1. The position of the second arc-shaped connecting surface 923 is cooperating with the position of the first arc-shaped connecting surface 922.

A plurality of material-evening rods 34 are inserted through and fixed to each of the stirring blades 33, and horizontally arranged and sequentially distributed along a contour of each of the stirring blades 33 around a periphery of the hole 331.

The mixing device further includes at least one pressurizing valve 6. One connection port of each pressurizing valve 6 is connected to the outer wall at the upper side of the cylindrical stirring chamber 1 and communicating with the interior of the cylindrical stirring chamber 1, without intersecting with the trough-type material-dropping hole 103 and the valve bore 104.

Operating Instructions:

The two monomer components (diol and diisocyanate) required for the synthesis of polyurethane are respectively connected to the other ports of the two metering valves 7 through pipes. A particle weighing device is prepared and iron sand is poured into the particle weighing device. A discharge port of the particle weighing device is connected to the upper opening of the granular material-feeding tube 5 through a pipe. A geared motor is set on one side of the mixing mechanism 3, and an output shaft of the geared motor is concentrically fixed to one end of the stirring shaft 31.

After temporarily closing the material-discharging tube 8 and opening the two metering valves 7, the two monomer components (diol and diisocyanate) will enter the two tubular material-feeding chambers 2 through the two metering valves 7 according to the ratio. Then, the geared motor is started to rotate its rotating shaft, which in turn drives the stirring shaft 31 to rotate, so that the two screw portions 311 rotate inside the two tubular material-feeding chambers 2 respectively, thereby pushing the two monomer components located inside the two tubular material-feeding chambers 2 to move towards the cylindrical stirring chamber 1. Finally, they are mixed and reacted inside the cylindrical stirring chamber 1 to generate polyurethane.

During the above process, it is also necessary to start the particle weighing device to input a certain amount of iron sand into the granular material-feeding tube 5. Then, the iron sand is distributed along the axial direction of the cylindrical stirring chamber 1 by means of the flat-port material-distributing tube 51, and then enters the trough-type recessed hole 101 through the end opening of the flat-port material-distributing tube 51. Then, it falls onto the arc-shaped material-distributing plate 4, and then falls into the trough-shaped material-dropping hole 103 through the plurality of material-distributing holes 41. Since the opening side of the arc-shaped material-distributing plate 4 is facing upward, the iron sand gathers towards the middle and does not stagnate at the edge.

In the initial state, the trough-type material-guiding hole 921 in the sealing and pressure-maintaining assembly 9 is vertically oriented, and the second arc-shaped connecting surface 923 is located inside the valve bore 104. The iron sand in the trough-type material-dropping hole 103 will continue to pass downward through the trough-type material-guiding hole 921 and enter the interior of the cylindrical stirring chamber 1, thereby making the iron sand evenly mixed into the polyurethane.

The lower portion of the valve bore 104 intersects and communicates with the inner wall at the upper side of the cylindrical stirring chamber 1. The first arc-shaped connecting surface 922 is formed on an outer wall of the valve stem 92 at one side of the interior of the cylindrical stirring chamber 1. The trough-type material-guiding hole 921 is formed between the first arc-shaped connecting surface 922 and the outer wall at one side of the valve stem 92 directly facing the trough-type material-dropping hole 103.

It is worth mentioning that when each stirring blade 33 rotates, the material inside the cylindrical stirring chamber 1 can move along the axial direction of the cylindrical stirring chamber 1 through the hole 331 in each of the stirring blades 33, thereby enabling the two monomer components to be fully mixed and reacted. At the same time, the plurality of material-evening rods 34 on each stirring blade 33 will also drive the material to roll around the circumference of the cylindrical stirring chamber 1 so as to improve the mixing effect of polyurethane and iron sand, and accelerate the reaction. Since the curvature of the first arc-shaped connecting surface 922 matches the curvature of the inner wall of the cylindrical stirring chamber 1, the rotating stirring blade 33 will not collide with the valve stem 92.

After mixing is complete, first close the two metering valves 7 and the particle weighing device to stop the input of iron sand. Then, turn off the geared motor to stop the rotation of the stirring shaft 31. Then, start the servo motor 91 in the sealing and pressure-maintaining assembly 9 to make its rotating shaft rotate, which in turn drives the valve stem 92 to rotate in the valve bore 104 until the second arc-shaped connecting surface 923 rotates to the intersection of the valve bore 104 and the inner wall of the cylindrical stirring chamber 1. At this time, both ends of the trough-type material-guiding hole 921 are located in the valve bore 104.

Finally, open each pressurizing valve 6 and connect the pressurized gas to another port of each pressurizing valve 6 through a pipe, so that the pressurized gas can be introduced into the cylindrical stirring chamber 1. Then, open the material-discharging tube 8, and the pressurized gas inside the cylindrical stirring chamber 1 will force the mixture of polyurethane and iron sand to be discharged downward through the material-discharging tube 8. Since both ends of the trough-shaped material-guiding hole 921 are located inside the valve bore 104, the mixture of polyurethane and iron sand under pressure will not flow upward back into the trough-type material-guiding hole 921 to cause blockage.

Figure 7:
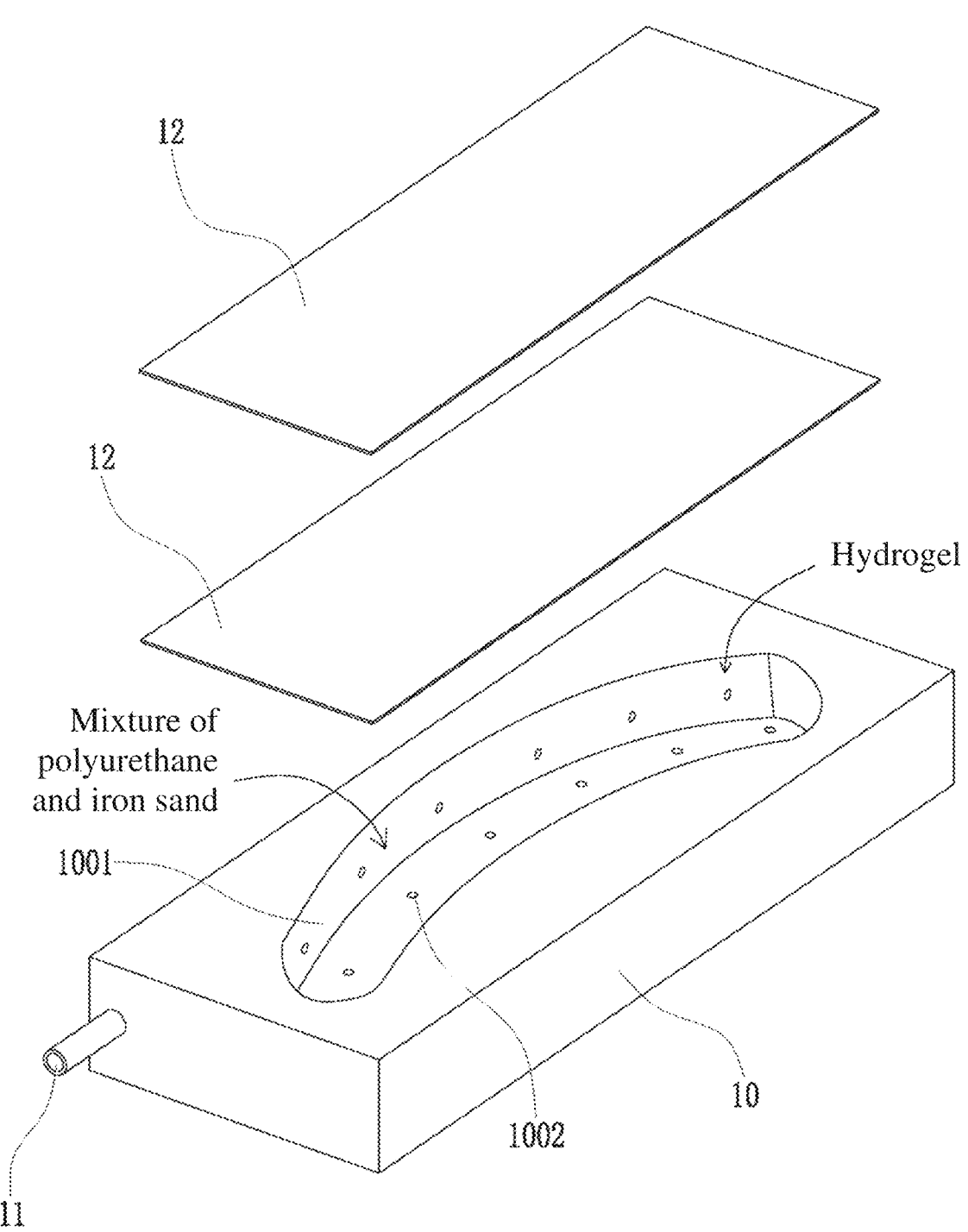
FIG. 7 is a schematic diagram illustrating the principle of the manufacturing process of the counterweight block of the present disclosure.

As shown in FIG. 7, a manufacturing process for the counterweight block of the weighted garment includes the following steps:

S1: take a piece of SBR diving cloth 12 and lay it flat on top of a molding module 10, then press it into a mold cavity 1001 located at a top portion of the molding module 10, and ensure that edges of the SBR diving cloth 12 remain outside the opening of the mold cavity 1001;

S2: connect an air inlet of a vacuum pumping device to an air outlet tube 11 connected to one side of the molding module 10, a plurality of capillary holes 1002 are formed on an inner wall of the mold cavity 1001, and are communicating with the air outlet tube 11, after starting the vacuum pumping device to operate, air inside the mold cavity 1001 is continuously extracted, thereby causing the SBR diving cloth 12 to tightly adhere to the inner wall of the mold cavity 1001 and form a space having a same shape as an interior of the mold cavity;

S3: introduce liquid polyurethane mixed with iron sand into the space formed by the SBR diving cloth 12 according to an interior contour of the mold cavity 1001, a flexible weighted layer 13 having elasticity is formed after the liquid polyurethane solidifies;

S4: spread hydrogel evenly onto a surface of the solidified polyurethane, subsequently, take another piece of SBR diving cloth 12 and cover it onto a surface of the hydrogel, a flexible cold-storage layer 14 is formed above the flexible weighted layer 13 after the hydrogel solidifies;

S5: take out the two pieces of SBR diving cloth 12 as well as the flexible weighted layer 13 and the flexible cold-storage layer 14 located between the two pieces of SBR diving cloth 12, and sew the two pieces of SBR diving cloth 12 to each other along edge contours of the flexible weighted layer 13 and the flexible cold-storage layer 14.

Finally, it should be noted that the above embodiments are only used to illustrate the technical solutions of the present disclosure, and not to limit them. Although the present disclosure has been described in detail with reference to the foregoing embodiments, those skilled in the art should understand that they can still modify the technical solutions described in the foregoing embodiments, or make equivalent substitutions for some of the technical features; and these modifications or substitutions do not cause the essence of the corresponding technical solutions to deviate from the spirit and scope of the technical solutions of the embodiments of the present disclosure.

What is claimed is:

1. A mixing device for a counterweight block of a weighted garment, wherein the mixing device comprises a cylindrical stirring chamber disposed horizontally, two tubular material-feeding chambers concentrically connected to two ends of the cylindrical stirring chamber respectively and both communicating with an interior of the cylindrical stirring chamber, a granular material-feeding tube connected to an upper side of the cylindrical stirring chamber and communicating with the interior of the cylindrical stirring chamber, a material-discharging tube connected to a lower side of the cylindrical stirring chamber and communicating with the interior of the cylindrical stirring chamber, and a mixing mechanism disposed within the interior of the cylindrical stirring chamber and interiors of the two tubular material-feeding chambers;

the mixing mechanism comprising two chamber covers sealingly fixed at end openings of the two tubular material-feeding chambers respectively, and a horizontal rotatable stirring shaft inserted through and connected concentrically between the two chamber covers, two ends of the stirring shaft being respectively provided with two screw portions having mutually opposite helical directions, the two screw portions being disposed within the interiors of the two tubular material-feeding chambers respectively;

the mixing mechanism further comprising two stirring blade units provided on the stirring shaft, distributed diagonally to each other, and both located within the interior of the cylindrical stirring chamber, each of the stirring blade units comprising a plurality of stirring blades fixed on the stirring shaft and arranged sequentially along a length direction of the stirring shaft, wherein the plurality of stirring blades of one of the stirring blade units and the plurality of stirring blades of another one of the stirring blade units are distributed mutually interspaced from each other;

the mixing device further comprising two metering valves, one connection port of the two metering valves being respectively connected to an outer wall of the two tubular material-feeding chambers, and communicating with the interiors of the two tubular material-feeding chambers respectively;

a shape of each of the stirring blades being elliptical, and a hole being opened in each of the stirring blades;

a plurality of material-evening rods being inserted through and fixed to each of the stirring blades, and horizontally arranged and sequentially distributed along a contour of each of the stirring blades around a periphery of the hole.

2. The mixing device for a counterweight block of a weighted garment according to claim 1, wherein a trough-type recessed hole is opened on an outer wall at the upper side of the cylindrical stirring chamber, and correspondingly, a flat-port material-distributing tube is provided at a lower end opening of the granular material-feeding tube, an end opening of the flat-port material-distributing tube being detachably embedded and fixed within an interior of an opening of the trough-type recessed hole.

3. The mixing device for a counterweight block of a weighted garment according to claim 2, wherein an arc-shaped limiting surface having an opening side facing upward is formed on a bottom surface of the trough-type recessed hole, and correspondingly, an arc-shaped material-distributing plate having an opening side facing upward is further provided in the trough-type recessed hole, an outer wall at a bottom of the arc-shaped material-distributing plate being abutted on the arc-shaped limiting surface; a trough-type material-dropping hole being opened between the arc-shaped limiting surface and an inner wall at the upper side of the cylindrical stirring chamber, a plurality of material-distributing holes being opened in the arc-shaped material-distributing plate and are evenly distributed, each of the material-distributing holes being disposed above an upper end opening of the trough-type material-dropping hole.

4. The mixing device for a counterweight block of a weighted garment according to claim 3, wherein a sealing and pressure-maintaining assembly is further provided on the cylindrical stirring chamber, and a valve bore is formed between outer walls at the two ends of the cylindrical stirring chamber, the valve bore being horizontally disposed, intersecting and communicating with the trough-type material-dropping hole, the sealing and pressure-maintaining assembly comprising a valve stem sealingly and rotatably disposed concentrically within the valve bore, and a servo motor fixed on the outer wall at one of the two ends of the cylindrical stirring chamber, a rotation shaft of the servo motor being horizontally disposed and fixed concentrically at one end of the valve stem.

5. The mixing device for a counterweight block of a weighted garment according to claim 4, wherein a lower portion of the valve bore intersects and communicates with the inner wall at the upper side of the cylindrical stirring chamber, a first arc-shaped connecting surface being formed on an outer wall of the valve stem at one side of the interior of the cylindrical stirring chamber, a curvature of the first arc-shaped connecting surface being matched with a curvature of an inner wall of the cylindrical stirring chamber, and a trough-type material-guiding hole being formed between the first arc-shaped connecting surface and the outer wall at one side of the valve stem directly facing the trough-type material-dropping hole.

6. The mixing device for a counterweight block of a weighted garment according to claim 5, wherein a second arc-shaped connecting surface is further formed on the outer wall of the valve stem on one side of the trough-type material-guiding hole, a curvature of the second arc-shaped connecting surface being matched with the curvature of the inner wall of the cylindrical stirring chamber, and a position of the second arc-shaped connecting surface cooperating with a position of the first arc-shaped connecting surface.

7. The mixing device for a counterweight block of a weighted garment according to claim 4, wherein the mixing device further comprises at least one pressurizing valve, one connection port of each pressurizing valve being connected to the outer wall at the upper side of the cylindrical stirring chamber, and communicating with the interior of the cylindrical stirring chamber, without intersecting with the trough-type material-dropping hole and the valve bore.

* * * * *